(12) United States Patent
Benthien

(10) Patent No.: US 8,220,744 B2
(45) Date of Patent: Jul. 17, 2012

(54) FITTING FOR INTRODUCING HIGH FORCES INTO A FUSELAGE CELL OF AN AIRCRAFT

(75) Inventor: Herrmann Benthien, Sottrum (DE)

(73) Assignee: Airbus Deutschland GmbH, Hamburg (DE)

( * ) Notice: Subject to any disclaimer, the term of this patent is extended or adjusted under 35 U.S.C. 154(b) by 885 days.

(21) Appl. No.: 12/009,149

(22) Filed: Jan. 16, 2008

(65) Prior Publication Data
US 2008/0173761 A1 Jul. 24, 2008

Related U.S. Application Data

(60) Provisional application No. 60/881,640, filed on Jan. 22, 2007.

(30) Foreign Application Priority Data

Mar. 9, 2007 (DE) .......................... 10 2007 011 613

(51) Int. Cl.
*B64C 1/06* (2006.01)
(52) U.S. Cl. ........................................ 244/131; 244/132
(58) Field of Classification Search .................. 244/131, 244/132, 129.1, 133
See application file for complete search history.

(56) References Cited

U.S. PATENT DOCUMENTS

| 571,042 | A | | 11/1896 | Edquist | |
|---|---|---|---|---|---|
| 1,774,593 | A | * | 9/1930 | Day et al. ...................... | 244/131 |
| 2,194,483 | A | * | 3/1940 | Schmidt ........................ | 244/132 |
| 2,403,881 | A | * | 7/1946 | Tarbox ....................... | 52/506.08 |
| 2,556,076 | A | | 6/1951 | Evans et al. | |
| 2,556,077 | A | | 6/1951 | Fetterly et al. | |
| 2,642,109 | A | | 6/1953 | Hollerith | |

(Continued)

FOREIGN PATENT DOCUMENTS
DE 19 724941 12/1998
(Continued)

OTHER PUBLICATIONS

International Search Report for PCT/EP/2008/050292 dated May 19, 2008.

(Continued)

*Primary Examiner* — Tien Dinh
*Assistant Examiner* — Philip J Bonzell
(74) *Attorney, Agent, or Firm* — Jenkins, Wilson, Taylor & Hunt, P.A.

(57) ABSTRACT

Disclosed is a fitting for introducing great loads into a fuselage cell of an aircraft, in particular those which emanate from undercarriage components or are introduced into them. The fitting has a shoulder plate for bearing against the inside of the skin of the fuselage cell for example over its full surface area. Arranged underneath the shoulder plate is a vertical lug shackle with a lug for introducing the loads, wherein the lug shackle is led to the outside through a clearance in the skin of the fuselage cell. At least one approximately upright fastening shackle is provided on the upper side of the shoulder plate for connecting the fitting to a frame web. According to the invention, the loads occurring are introduced into the frame, substantially "moment-free" in the region of a neutral fiber, so that the said frame is not exposed to any appreciable flexural stresses and can be of a more lightweight design. The frame becomes the load introducing instrument and distributes the loads uniformly into the skin of the fuselage cell. Radially acting loads are transferred from the shoulder plate directly into the skin of the fuselage cell by way of shearing.

12 Claims, 2 Drawing Sheets

U.S. PATENT DOCUMENTS

| | | | |
|---|---|---|---|
| 2,700,412 A | | 1/1955 | Evans et al. |
| 2,758,365 A | | 8/1956 | Ricefield |
| 2,789,457 A | | 4/1957 | Allen |
| 2,920,672 A | | 1/1960 | Bronson |
| 3,208,496 A | | 9/1965 | Phelan |
| 3,314,720 A | | 4/1967 | Millington et al. |
| 3,463,424 A | * | 8/1969 | Pickell .................. 244/131 |
| 3,765,626 A | | 10/1973 | Maynard et al. |
| 3,866,955 A | | 2/1975 | Maynard et al. |
| 3,868,143 A | | 2/1975 | Reilly |
| 4,005,765 A | | 2/1977 | Reilly |
| 4,266,381 A | | 5/1981 | Deller |
| 4,392,623 A | * | 7/1983 | Munsen et al. .......... 244/102 R |
| 5,180,263 A | | 1/1993 | Flowers, Jr. |
| 5,291,704 A | | 3/1994 | Savorani |
| 5,568,847 A | | 10/1996 | Guilloud et al. |
| 5,683,131 A | | 11/1997 | Lucas |
| 5,931,415 A | | 8/1999 | Lingard et al. |
| 6,394,393 B1 | | 5/2002 | Mort |
| 6,454,210 B1 | | 9/2002 | Plattner |
| 6,530,544 B2 | | 3/2003 | Milliere |
| 6,663,314 B2 | | 12/2003 | Bequet |
| 6,732,976 B2 | | 5/2004 | Hessling et al. |
| 6,769,831 B2 | | 8/2004 | Aquino et al. |
| 6,848,650 B2 | | 2/2005 | Hoisington et al. |
| 6,883,753 B1 | | 4/2005 | Scown |
| 6,889,939 B2 | | 5/2005 | Rouyre et al. |
| 7,021,587 B1 | | 4/2006 | Younkin |
| 7,370,452 B2 | | 5/2008 | Rogers |
| 7,374,137 B2 | | 5/2008 | Staney |
| 7,407,135 B2 | | 8/2008 | Rouyre |
| 7,462,006 B2 | | 12/2008 | Benthien |
| 7,497,638 B2 | | 3/2009 | Tubbs et al. |
| 7,594,701 B2 | | 9/2009 | Kawabata et al. |
| 7,637,686 B2 | | 12/2009 | Wood et al. |
| 7,648,115 B2 | | 1/2010 | Lambert et al. |
| 7,748,661 B2 | | 7/2010 | Harris et al. |
| 7,775,479 B2 | | 8/2010 | Benthien |
| 7,784,734 B2 | | 8/2010 | Christman |
| 2003/0205011 A1 | | 11/2003 | Bequet |
| 2003/0209929 A1 | | 11/2003 | Muin et al. |
| 2004/0245391 A1 | | 12/2004 | Kunzel et al. |
| 2004/0258498 A1 | | 12/2004 | Bruns |
| 2005/0211833 A1 | | 9/2005 | Frantz et al. |
| 2005/0224650 A1 | | 10/2005 | Reed et al. |
| 2006/0011781 A1 | | 1/2006 | Knoll et al. |
| 2006/0108477 A1 | | 5/2006 | Helou, Jr. et al. |
| 2006/0237586 A1 | | 10/2006 | Barackman et al. |
| 2006/0278761 A1 | | 12/2006 | Cutler et al. |
| 2008/0099601 A1 | | 5/2008 | Christman |
| 2008/0112753 A1 | | 5/2008 | Tubbs et al. |
| 2008/0173755 A1 | | 7/2008 | Benthien |
| 2008/0173758 A1 | | 7/2008 | Benthien |
| 2008/0173761 A1 | | 7/2008 | Benthien |
| 2008/0213034 A1 | | 9/2008 | Wood et al. |
| 2010/0044510 A1 | | 2/2010 | Schroeer et al. |
| 2010/0051746 A1 | | 3/2010 | Law |
| 2011/0108668 A1 | | 5/2011 | Benthien |

FOREIGN PATENT DOCUMENTS

| | | |
|---|---|---|
| DE | 10 324648 | 12/2004 |
| EP | 1234984 | 8/2002 |
| EP | 1342927 | 9/2003 |
| EP | 1637449 | 3/2006 |
| FR | 2599793 | 11/1987 |
| FR | 2821129 | 8/2002 |
| FR | 2836890 | 9/2003 |
| FR | 2883939 | 10/2006 |
| GB | 2026623 | 2/1980 |
| SU | 1539430 A1 | 1/1990 |

OTHER PUBLICATIONS

German Office Action for DE 10 2007 011611 dated Dec. 8, 2009.
German Office Action for DE 10 2007 011621 dated Dec. 10, 2009.
Notice of Allowance from U.S. Appl. No. 12/009,625 dated May 18, 2010.
German Office Action for DE 10 2007 001613.8 dated Nov. 19, 2010.
Office Action for U.S. Appl. No. 12/008,975 dated Nov. 23, 2010.
Office Action for U.S. Appl. No. 12/008,975 dated Jun. 14, 2010.
Notice of Allowance for U.S. Appl. No. 12/009,620 dated Oct. 15, 2010.
Non-Final Office Action for U.S. Appl. No. 12/008,975 dated Apr. 25, 2011.
Final Office Action for U.S. Appl. No. 12/008,975 dated Sep. 30, 2011.
Notice of Allowance for U.S. Appl. No. 12/521,247 dated Nov. 9, 2011.
Supplemental Notice of Allowance for U.S. Appl. No. 12/521,247 dated Nov. 18, 2011.
Notice of Allowance for U.S. Appl. No. 12/521,247 dated Feb. 17, 2012.
Russian Grant Notice for RU 2009130305/11 dated Jan. 13, 2012.

* cited by examiner

FITTING FOR INTRODUCING HIGH FORCES INTO A FUSELAGE CELL OF AN AIRCRAFT

CROSS-REFERENCE TO RELATED APPLICATIONS

This application claims the benefit of U.S. Provisional Application No. 60/881,640, filed Jan. 22, 2007 and German patent application No. 10 2007 011 613.8, filed Mar. 9, 2007, the entire disclosures of which are herein incorporated by reference.

FIELD OF THE INVENTION

The invention relates to a fitting, in particular a landing gear fastening fitting or undercarriage fastening fitting, for introducing high forces into a fuselage cell of an aircraft stiffened with a multiplicity of frames and having a lug shackle, in which a lug for introducing the forces, in particular the forces emanating from undercarriage components, is arranged.

BACKGROUND OF THE INVENTION

The introduction of high external loads into the fuselage structure of an aircraft involves complex structural design requirements and intensive weight requirements. Until now, two variants have been used for the connection in aircraft construction. Such forms of load occur, for example, at the undercarriage during the takeoff or landing of an aircraft.

In the case of a first variant, a fork-shaped fitting with a base plate is screwed or riveted through the skin of the fuselage cell to an interior frame. It is of disadvantage in the case of this embodiment that the frame flanges are subjected to flexural loading and this increased stress has to be taken into consideration in the dimensioning. In addition, the frame flange must be of a width that corresponds to a width of the base plate of the fork fitting, at least in the connecting region. Since the introduction of the loads takes place in a punctiform manner, both the skin of the fuselage cell and the frame must be locally reinforced, which is very difficult in terms of structural design, specifically in the case of the skin of the fuselage cell. The overall effect of the influencing factors mentioned is that of increasing the weight.

In the case of a second variant, frames are used for the force introduction, the fork fitting being an integral part of the frame itself. This form of construction requires wide frames in the connecting region, since on the one hand the width of the frame must correspond to the width of the fork fitting and on the other hand the external loads in the edge region of the integrally formed fork fitting are transferred into the skin of the fuselage cell. A further difficulty is that this cutout in the skin of the fuselage cell, which is already large in any case, requires a second-row, pressure-tight riveting. Both aspects have a weight-increasing effect. In addition, the production of the fork fittings formed integrally with the frame is found to be very complex in production engineering terms.

SUMMARY OF THE INVENTION

One of the objects of the invention is to avoid the disadvantages of the known forms of construction for the introduction of external forces into a fuselage cell, in particular in the form of an undercarriage connection to the fuselage cell.

Accordingly, a fitting, in particular an undercarriage fastening fitting, for introducing high forces into a fuselage cell of an aircraft stiffened with a multiplicity of frames has a lug shackle, the fitting comprising a lug shackle, arranged in which is a lug for introducing forces emanating from undercarriage components, and a shoulder plate for bearing against the inside of the skin of the fuselage cell, the shoulder plate being arranged on the inside of the fuselage cell, at least one approximately vertically upward pointing fastening shackle being arranged on the shoulder plate for the connection to a frame web, and the lug shackle, which is directed vertically downward, being arranged underneath the shoulder plate and guided to the outside through a clearance in the skin of the fuselage cell.

The fact that the fitting arranged on the inside of the fuselage structure has a shoulder plate for bearing against the inside of the skin of the fuselage cell, wherein at least one vertically upward pointing fastening shackle is arranged on the shoulder plate for the connection to a frame web and a vertically downward directed lug shackle is arranged underneath the shoulder plate and led to the outside through a clearance in the skin of the fuselage cell, means that the external forces acting on the fitting lug are for the most part introduced into the frame in the region of the neutral fiber. This avoids any appreciable stressing of the frame by offset moments. The direct introduction of load into the frame obviates the need for local thickenings of the skin of the fuselage cell. The frame serves for distributing the load. The dimensions of the penetration through the skin are limited in comparison with the integral component.

According to one embodiment, the lug shackle is arranged on the shoulder plate such that it is offset by a distance with respect to the fastening shackle.

This achieves the effect that the clearance in the skin of the fuselage cell required for leading the lug shackle through to the outside is not right up against the frame and easier sealing is possible.

In accordance with a further embodiment, the at least one fastening shackle is provided with a reinforcing rib.

As a result of this, the flexural rigidity of the fastening shackles in the direction of the longitudinal axis of the aircraft, that is to say transversely in relation to the axis of the frame, is increased.

According to a further embodiment of the fitting, it has only two fastening shackles.

This results in a simplified production process with at the same time a reduced mass of the fitting, the load transfer capability being less in relation to a variant of the fitting with three fastening shackles. The one-piece fitting may be produced with a high-strength metallic material, such as for example an aluminium alloy, a titanium alloy or a high-grade steel alloy. Production may be performed, for example, by machining from a corresponding solid material. Alternatively, production by means of the known casting, forging or spark-erosion processes is possible. Furthermore, the fitting may also be formed by a composite material, such as for example a carbon fiber reinforced epoxy resin with an alignment of the reinforcing fibers that is optimized in terms of the flux of force.

A further embodiment of the fitting provides that it has three fastening shackles.

This increases the force transfer capability in relation to the variants with only one or two fastening shackles.

BRIEF DESCRIPTION OF THE DRAWINGS

In the figures, the same structural elements have in each case the same reference numerals.

DETAILED DESCRIPTION OF THE INVENTION

Figure 1:
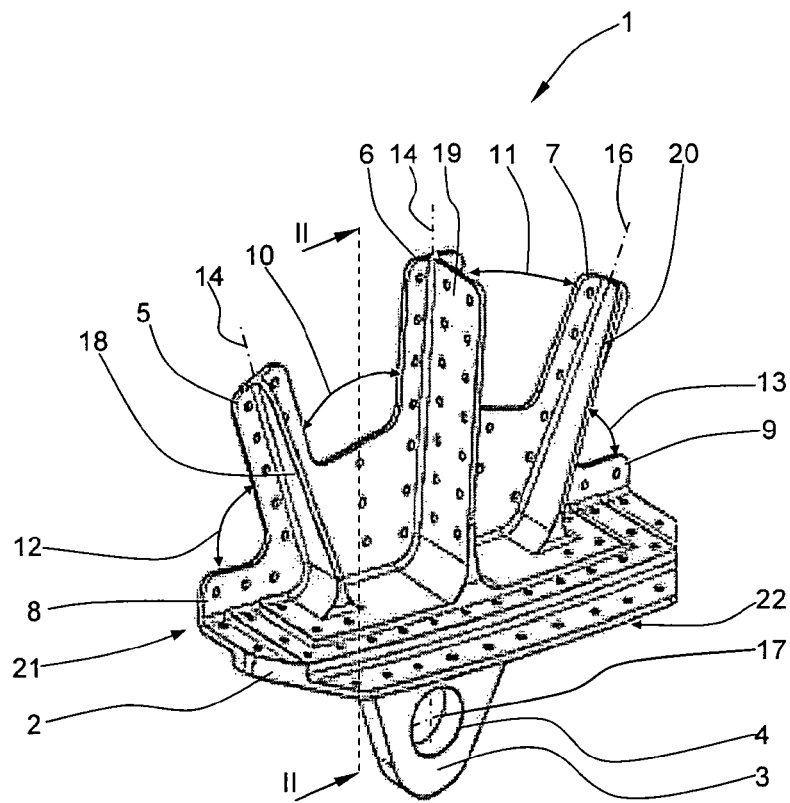
FIG. 1 shows a perspective view of the fitting with three fastening shackles.

FIG. 1 shows a fitting according to an embodiment the invention in a perspective view.

The one-piece fitting 1 comprises a shoulder plate 2, on the underside of which a lug shackle 3 with a lug 4 is arranged. The lug shackle 3 with the lug 4 serves for connecting further components, which are not represented, in particular components of an undercarriage for an aircraft. Arranged above the shoulder plate 2 are fastening shackles 5 to 7, which form with the shoulder plate 2 an included angle of approximately 90°. The fastening shackles 5 and 7 are laterally adjoined by two smaller flanges 8, 9. The flanges 8, 9 run along the rear edge of the shoulder plate 2 and stand upright on the shoulder plate 2. The fastening shackles 5 to 7 and the flanges 8, 9 have a pattern of holes with a multiplicity of holes, which are not designated but through which the fastening of the fitting 1 to a frame of a fuselage cell that is not represented in FIG. 1 takes place by means of rivets and/or screws. The two fastening shackles 5, 6 and 6, 7 respectively form in relation to one another an included angle 10, 11 of approximately 45°. The two outer fastening shackles 5, 7 respectively form with the shoulder plate 2 an included angle 12, 13 of likewise approximately 45°. The middle fastening shackle 6 stands upright on the shoulder plate 2. Intermediate spaces between the fastening shackles 5, 6 and 6, 7 have bearing surfaces that are approximately in the form of segments of a circle and are likewise provided with holes.

In this embodiment, the extensions of the center lines 14 to 16 of the three fastening shackles 5 to 7 intersect at a center point 19 of the lug 4, in order to ensure an optimum force transfer from the lug 4 to the fastening shackles 5 to 7.

The fastening shackles 5 to 7 respectively have reinforcing ribs 18 to 20 standing upright on the fastening shackles. A material thickness of the shoulder plate 2 is reduced in stages and/or without any transition, from a rear edge 21 to a front edge 22. In the shown exemplary embodiment of FIG. 1, the middle reinforcing rib 19 is provided with a pattern of holes, which is not designated but has a multiplicity of holes for the connection of further components, which are not depicted.

Figure 2:
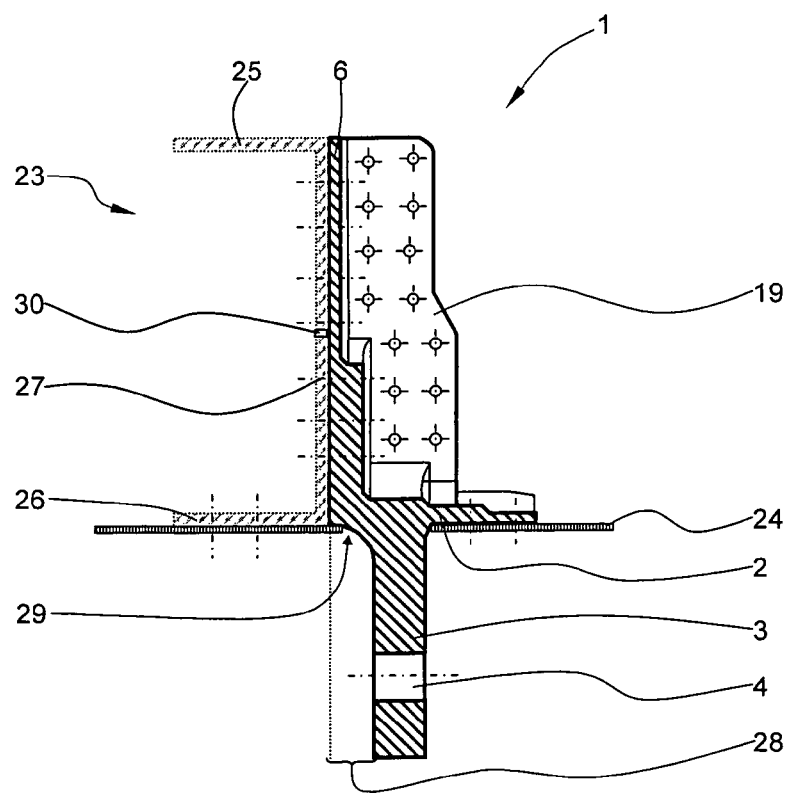
FIG. 2 shows a section along the sectional line II-II of FIG. 1 through the fitting.

FIG. 2 shows a section through the fitting according to FIG. 1 along the sectional line II-II.

The fitting 1 is connected both to the frame 23 and to the outer skin 24 of the fuselage cell by a multiplicity of rivets and/or screws (dashed lines), which are not designated any more specifically, in the region of the fastening shackle 6 and the shoulder plate 2. The frame 23 has a substantially C- or a U-shaped cross-sectional geometry with an upper flange 25, a lower flange 26 and a frame web 27, connecting the two flanges 25, 26. The stiffening of the fastening shackle 6 and the shoulder plate 2 takes place by means of the reinforcing rib 19. The fastening shackle 6, like the other fastening shackles too, stands upright on the shoulder plate 2. Underneath the shoulder plate 2 there adjoins the lug shackle 3 with the lug 4, the lug shackle 3 being arranged on the shoulder plate 2 such that it is offset with respect to the fastening shackle 6 by a distance 28. A clearance 29 for leading the lug shackle 3 through the skin 24 of the fuselage cell has been made in the skin 24 of the fuselage cell. The clearance 29 is sealed with respect to the skin 24 of the fuselage cell and the lug shackle 3 by means of sealing elements that are not represented. The clearance 29 is provided with suitable sealing. Furthermore, there are seals between the lower frame flange 26 and the skin 24 of the fuselage cell as well as between the shoulder plate 2 and the skin 24 of the fuselage cell.

The fitting 1 has a multiplicity of holes, which are not provided with a reference numeral and some of which are arranged in the form of a pattern of holes. The holes are indicated by dash-dotted lines. Fastening means for the final assembly are produced by the holes, whereby the fitting 1 is connected both to the frame 23 and to the outer skin 24 of the fuselage cell. Rivets and/or screws come into consideration, for example, as fastening means.

In this embodiment, the fitting 1 is formed in one piece by a metal alloy of high mechanical strength, such as for example an aluminium alloy, a titanium alloy or a high-grade steel alloy. Alternatively, the fitting 1 may, for example, be formed by in a CRP material.

The fitting 1 according to the invention has the advantage in comparison with previously known embodiments that force effects emanating from the lug 4 are introduced substantially "moment-free", that is to say directly into the region of the neutral fiber 30 of the frame 23. Accordingly, the upper and lower frame flanges 25, 26 are no longer laterally stressed by offset moments. Loads from the skin 24 of the fuselage cell are introduced into the frame web 27 directly by shearing. Radial loads are likewise introduced by way of shearing of the shoulder plate 2 into the skin 24 of the fuselage cell.

The fitting 1 (so-called "shoulder blade fitting") may be used for connecting the undercarriage to the fuselage cell of aircraft, it being possible for high forces that emanate from the undercarriage or forces that are introduced into the undercarriage to be transferred in both directions between the undercarriage and the fuselage cell by way of the fitting 1.

Figure 3:
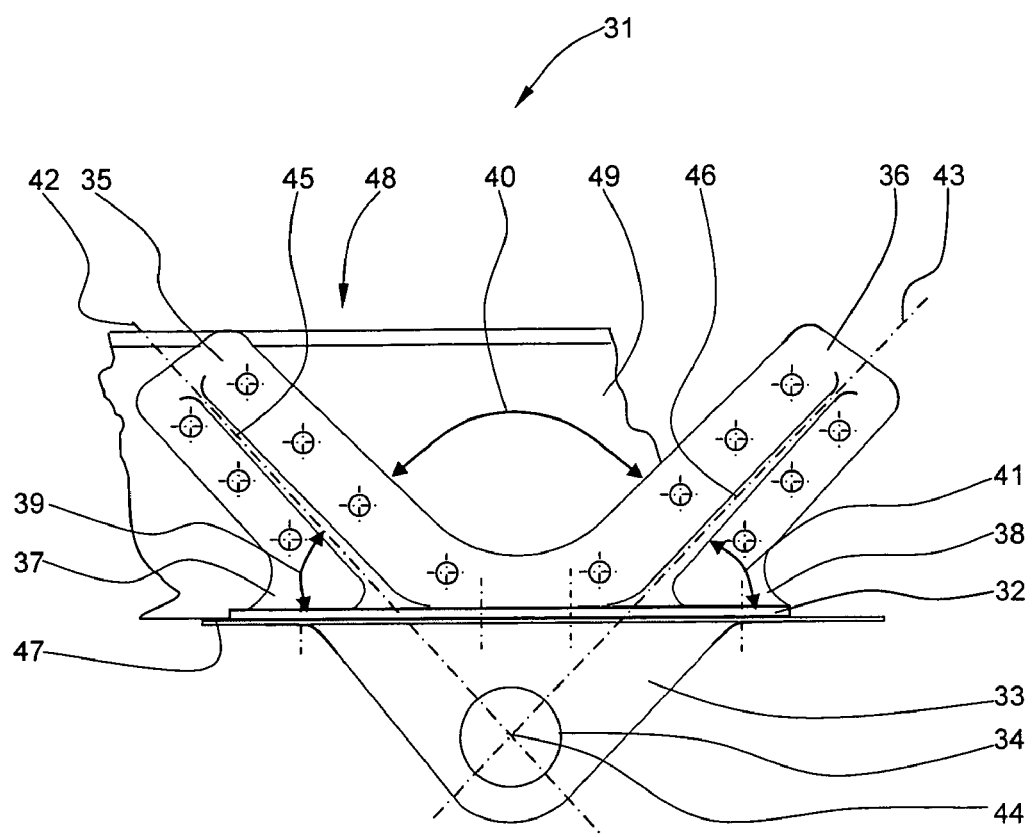
FIG. 3 shows a plan view of a fitting with two fastening shackles.

FIG. 3 shows a slightly modified embodiment of the fitting in plan view.

A fitting 31 comprises a shoulder plate 32 (running perpendicular to the plane of the drawing), to which a lug shackle 33 with a lug 34 is fastened. As a difference from the embodiment in accordance with FIGS. 1 and 2, the fitting 31 has only two fastening shackles 35, 36. The fastening shackles 35, 36 are adjoined on the outside by two flanges 37, 38. The fastening shackles 35, 36 form with the shoulder plate 32 the included angles 39, 41 of approximately 45°. Between the fastening shackles 35, 36 themselves there is an angle 40 of approximately 90°. Angles deviating from the values mentioned are possible in the case of both variants of the fitting 1, 31. In addition, depending on the mechanical requirements, the fitting may have one fastening shackle or more than three fastening shackles.

In this embodiment, the two center lines 42, 43 intersect at the center point 44 of the lug 34. The fastening shackles 35, 36 are stiffened with reinforcing ribs 45, 46. The shoulder plate 32 preferably rests over its full surface area on the skin 47 of the fuselage cell. For this purpose, the shoulder plate 32 has a slight curvature, which is adapted as exactly as possible to the radius of curvature of the skin of the fuselage cell.

The fitting 31 has a multiplicity of holes, which are not designated but are indicated by dash-dotted lines. Fastening elements that are not represented are led through the holes for connecting the fitting 31 to the fuselage structure, which is likewise provided with a multiplicity of holes for this purpose. The fitting 31 is connected by means of the two fastening shackles 35, 36 to a frame 48 in the region of a frame web 49 and the fitting 31 is joined together with the outer skin 47 of the fuselage cell by the shoulder plate 32. As in the case of the variant of the fitting 1 in accordance with FIGS. 1 and 2, screws and/or rivets come into consideration, for example, as fastening elements 50, 51. In principle, the fitting 1, 31 may also be connected to the fuselage cell by adhesive bonding.

The variant in accordance with FIG. 3 has a less complex construction, but in relation to the first type of construction can only transfer lower forces, as a result of the only two fastening shackles.

What is claimed is:

1. A fitting for introducing high forces into a fuselage cell of an aircraft stiffened with a multiplicity of frames, the fitting comprising:
    a lug shackle, arranged in which is a lug for introducing forces emanating from undercarriage components, and
    a shoulder plate for bearing against the inside of the skin of the fuselage cell, the shoulder plate being arranged on the inside of the fuselage cell,
    at least one approximately vertically upward pointing fastening shackle being arranged on the shoulder plate for the connection to a frame web, and
    the lug shackle, which is directed vertically downward, being arranged underneath the shoulder plate and guided to the outside through a clearance in the skin of the fuselage cell;
    wherein the forces introduced into the fuselage cell are transferred between the undercarriage and the fuselage cell by way of the fitting;
    wherein loads from the skin of the fuselage cell are introduced into the frame web by shearing; and
    wherein radial loads are introduced by way of shearing of the shoulder plate into the skin of the fuselage cell.

2. The fitting according to claim 1, wherein the lug shackle is arranged underneath the shoulder plate such that it is offset by a distance with respect to the at least one fastening shackle.

3. The fitting according to claim 1, wherein the fitting comprises two fastening shackles, the fastening shackles having center lines that intersect at a center point of the lug.

4. Presented) The fitting according to claim 1, wherein the fitting has three fastening shackles, the fastening shackles having center lines that intersect at a center point of the lug.

5. The fitting according to claim 1, wherein the shoulder plate is formed such that it is curved, at least in certain portions, in order to ensure that it bears against the frame as far as possible with its full surface area.

6. The fitting according to claim 1, wherein the fitting is an undercarriage fastening fitting.

7. The fitting according to claim 1, wherein the at least one fastening shackle comprises a reinforcing rib.

8. The fitting according to claim 7, wherein further components can be fastened to the at least one reinforcing rib.

9. The fitting according to claim 1, wherein the at least one fastening shackle is connected to the frame web and the shoulder plate is connected to the skin of the fuselage cell.

10. The fitting according to claim 9, wherein the at least one fastening shackle and the shoulder plate are connected by at least one of rivets and screws.

11. The fitting according to claim 1, wherein the fitting is formed in one piece by a high-strength material.

12. The fitting according to claim 11, wherein the high-strength material is an aluminum alloy, a titanium alloy, a high-grade steel alloy or a combination of these.

* * * * *